(12) United States Patent
Bang et al.

(10) Patent No.: US 7,185,856 B2
(45) Date of Patent: Mar. 6, 2007

(54) METHOD FOR CONTROLLING THE ATTITUDE OF AN SATELLITES IN ELLIPTIC ORBITS USING SOLAR RADIATION PRESSURE

(75) Inventors: Hyo-Choog Bang, Daejon (KR); Krishna Dev Kumar, Daejon (KR); Min-Jae Thak, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 1 day.

(21) Appl. No.: 11/011,835

(22) Filed: Dec. 15, 2004

(65) Prior Publication Data

US 2006/0011783 A1   Jan. 19, 2006

(30) Foreign Application Priority Data

Jul. 13, 2004   (KR) ................ 10-2004-0054245

(51) Int. Cl.
   *B64G 1/36*   (2006.01)
(52) U.S. Cl. ........................ 244/168; 244/164
(58) Field of Classification Search ............... 244/168, 244/172.7, 158.6, 171, 172.8
   See application file for complete search history.

(56) References Cited

U.S. PATENT DOCUMENTS

| | | | |
|---|---|---|---|
| 3,304,028 A | | 2/1967 | Nicklas et al. |
| 3,339,863 A | | 9/1967 | Nicklas et al. |
| 4,262,867 A | * | 4/1981 | Piening ................ 244/168 |
| 4,325,124 A | | 4/1982 | Renner |

(Continued)

FOREIGN PATENT DOCUMENTS

DE   2537577   3/1977

(Continued)

OTHER PUBLICATIONS

Joshi et al., "New Solar Attitude Control Approach for Satellites in Elliptic Orbits," Journal of Guidance and Control, vol. 3, No. 1 (1980), pp. 42-47.

*Primary Examiner*—Teri Pham Luu
*Assistant Examiner*—Joshua Michener
(74) *Attorney, Agent, or Firm*—Nixon & Vanderhye, PC (57) ABSTRACT

The present invention provides a method for the attitude control of satellites in elliptic orbits or satellites initially placed in circular orbits perturbed to elliptic orbits due to environmental disturbances. The method relies on the application of solar radiation pressure to provide the desired torque for the satellite attitude control. The satellite is equipped with two-oppositely placed light-weight solar panels extending away from the satellite along a predetermined direction (satellite body fixed Y-axis). By rotating one of these solar panels or both of them through desired angles about their axis using the respective driver motors as per the simple open-loop control law, the torque about the satellite axis is developed to achieve the desired attitude performance. The open-loop control law is derived using an analytical approach to neutralize the excitation caused by eccentricity and it is implemented via analog logic based on the information of sun angle and satellite position provided by the sensors. The present invention significantly improves the performance of the satellite by a factor of more than 20 times approximately in general and it only requires the rotation of the solar panels by fraction of a degree for particular system parameters. Thus, the semi-passive nature of the present invention makes it attractive for future space applications.

4 Claims, 11 Drawing Sheets

U.S. PATENT DOCUMENTS

| | | | |
|---|---|---|---|
| 4,591,116 A * | 5/1986 | Guenther et al. | 244/168 |
| 4,732,354 A * | 3/1988 | Lievre | 244/170 |
| 4,747,567 A | 5/1988 | Johnson et al. | |
| 4,949,922 A * | 8/1990 | Rosen | 244/168 |
| 5,133,518 A * | 7/1992 | Flament | 244/168 |
| 5,149,022 A * | 9/1992 | Flament | 244/168 |
| 5,269,483 A * | 12/1993 | Flament | 244/164 |
| 5,310,144 A | 5/1994 | Salvatore et al. | |
| 5,312,073 A * | 5/1994 | Flament et al. | 244/168 |
| 5,626,315 A * | 5/1997 | Flament et al. | 244/168 |
| 5,697,582 A * | 12/1997 | Surauer et al. | 244/168 |
| 5,775,645 A * | 7/1998 | Yocum, Jr. et al. | 244/168 |
| 5,850,992 A * | 12/1998 | Flament et al. | 244/168 |
| 6,070,833 A * | 6/2000 | Burke et al. | 244/168 |

FOREIGN PATENT DOCUMENTS

| | | |
|---|---|---|
| EP | 0295978 | 12/1988 |
| FR | 2513589 | 4/1983 |
| FR | 2529166 | 12/1983 |
| FR | 2530046 | 1/1984 |
| FR | 2531547 | 2/1984 |
| FR | 2550757 | 2/1985 |
| FR | 2552614 | 3/1985 |
| FR | 2655167 | 5/1991 |
| FR | 2656586 | 7/1991 |

* cited by examiner

METHOD FOR CONTROLLING THE ATTITUDE OF AN SATELLITES IN ELLIPTIC ORBITS USING SOLAR RADIATION PRESSURE

BACKGROUND OF THE INVENTION

1. Field of the Invention

The invention relates to a method for controlling attitudes of a satellites in elliptic orbits or satellites initially placed in circular orbits perturbed to elliptic orbits due to environmental disturbances.

2. Background of the Related Art

Hereafter, a satellite means any artificial object in the solar system in orbit around the Earth or any other planet or object of the solar system, or, in solar orbit. The attitude stability of satellites represents aspects of considerable importance for successful completion of a space mission. Unfortunately, even though a satellite may be precisely oriented at the beginning, it deviates in time from its preferred orientation under the influence of environmental forces like gravity gradient, solar radiation pressure, magnetic, aerodynamic, free molecular reaction forces, and others. However, these forces, if properly utilized, may stabilize the attitude of the satellite instead of deteriorating it. The solar radiation pressure (SRP) for attitude control of high altitude satellites and interplanetary probes has been proposed in several patents and journal papers.

French Patent No. 2,513,589 discusses a method and a device for aligning the roll axis of a spin-stabilized satellite along a required direction. The satellite is fitted with fixed solar panels and mobile surfaces mounted at the ends of the panels.

French Patent No. 2,550,757 proposes the position control of the satellite by deforming the solar panels to impose a variable backwards curvature on each of them.

French Patent No. 2,529,166 discloses a satellite station-keeping method using solar sails and a space vehicle implementing this method.

German Patent No. 2,537,577 explains the provision at the end of the solar panel surfaces that can be oriented about the axis of the solar panels and transversely thereto.

U.S. Pat. No. 3,304,028: "Attitude Control for Spacecraft", is similar to French Patent No. 2,513,589, previously mentioned, as is U.S. Pat. No. 3,339,863.

French Patent No. 2,530,046 entitled "Geosynchronous Satellite Attitude Control System" proposes the variation of the relative orientation of the solar panels about their axes similar to U.S. Pat. No. No. 4,325,124 entitled "System for Controlling the Direction of the Momentum Vector of a Geosynchronous Satellite".

European Patent No. 0,295,978 presents a device and a method for pointing a space probe towards a heavenly body. North and South solar sails are added to the satellite having asymmetrical surface areas, orientations about a North-South axis or inclinations transverse to this axis.

French Patent No. 2,552,614 proposes a satellite configuration with improved solar means comprising solar panels oriented transversely to the North-South axis and adapted to be oriented about axes transverse to the North-South axis.

U.S. Pat. No. 4,262,867 explains the position and attitude control of a spacecraft by solar panels and vanes adapted to be partially retracted accordion fashion relative to the direction of the ambient SRP.

U.S. Pat. No. 4,591,116 proposes the attitude control of a spacecraft accomplished by changing the effective surface area of the solar panels facing the sun in accordance with certain rules of asymmetry and utilization of pulling cables.

U.S. Pat. No. 4,747,567 describes the attitude control of a spacecraft by an articulation device for changing the position of the solar array relative to the spacecraft body independently about all three axes.

U.S. Pat. No. 5,310,144 explains a method and apparatus for balancing SRP and gravity-gradient disturbance torques acting upon a satellite are based upon tilting of the satellite solar panels toward or away from the sun with respect to the satellite body-fixed frame.

U.S. Pat. No. 5,850,992 provides a method for controlling the pitch attitude of a geostationary satellite is suggested by tilting the satellite solar panels using an on-board computer. The tilting is also used to position the center of gravity of the satellite during orbit control maneuvers so as to minimize the disturbances caused by an offset between the center of gravity and the real thrust vector of orbit control thrusters.

Various configurations such as a trailing cone system, weathervane type tail surfaces, a reflector-collector system, corner mirror arrays, solar paddles, grated solar sails, and mirror-like surfaces have been suggested for properly utilizing SRP torque. These concepts have been applied to sun-pointing satellites and gravity-oriented satellites. Spinning as well as non-spinning satellites was also considered. The attitude control of the satellite has been accomplished by translational motions of single or several control surfaces relative to the satellite body or by rotating the control surfaces about satellite body-fixed axes. Some missions have also been flown to verify these concepts involving SRP for the satellite attitude control. The Mariner IV mission employed solar vanes for achieving passive sun pointing attitude. The European Space Agency conducted experiments in which the attitude of the geostationary communication satellite OTS-2 was controlled by rotating solar panels.

Thus, the SRP control torque can be utilized to stabilize vibrational dynamics of a satellite with a desired degree of accuracy. However, in the case when the satellites are in elliptic orbits, the amplitude of attitude oscillations increases rapidly with increase in eccentricity. Even though there are no attitude disturbances initially, the attitude motion gets excited and become unstable in the presence of high eccentricity. To overcome the adverse effect of eccentricity, Kumar and Joshi applied the SRP torque to control the attitude of axis-symmetric satellites by regulating the translatory motions of the control surfaces relative to the satellite body. However, instead of applying translatory motions of the control surfaces, it would be better and easy if we can stabilize the satellite by the rotating control surfaces and that too if the angle of rotation is small on the order of a degree or fraction of a degree. Such investigations concerning the attitude control of satellites in elliptic orbits by rotating the control surfaces have not yet been discussed in the literature. In the present invention, we provide a method for resolving this problem for an earth-oriented non-axis-symmetric satellite.

SUMMARY OF THE INVENTION

An object of the invention is to provide a method for utilizing SRP acting on the pre-existing solar panels to control the attitude of a satellite in pitch reliably and simply, with least possible additional mass attributed to sensors and actuators, in manner that is decoupled and compatible with any known type of roll/yaw control, also based on SRP, for example.

Another object of the invention is to provide a method for reducing the power requirement for attitude control with no significant mass or reliability penalty.

A further object of the invention is to provide a method for obtaining maximum benefit for attitude control.

Still a further object of the invention is to provide a method for developing an open-loop control law for rotating the solar panels through desired angles.

To achieve the above objects the present invention proposes a satellite having two solar panels mounted on the driving motors. The driving motors rotate one of these solar panels or both of them through desired angles about their axis as per the open-loop control law and thereby the torque about the satellite axis is developed to achieve the desired satellite attitude performance. The open-loop control law is developed to neutralize the excitation caused by eccentricity and is implemented via analog logic based on the information of sun angle and satellite position provided by the sensors.

If a satellite is placed into orbit, the solar panel of any kind, including a solar cell array or solar sails, are folded, rolled up, or in any manner compactly stored during launching procedure, and these devices are deployed after the satellite has attained its orbit.

The benefit of the invention lies in the fact that the pitch control obtained does not modify, or modifies only minimally, the roll/yaw behavior of the satellite, so that it can be combined with any known type of roll/yaw control.

Objects, features and advantages of the invention will emerge from the following description given by way of non-limiting example with reference to the appended drawings.

BRIEF DESCRIPTION OF THE DRAWINGS

Objects, features and advantages of the invention will emerge from the following description given by way of non-limiting example with reference to the appended drawings and in which.

DETAILED DESCRIPTION OF THE PREFERRED EMBODIMENT

Figure 1:
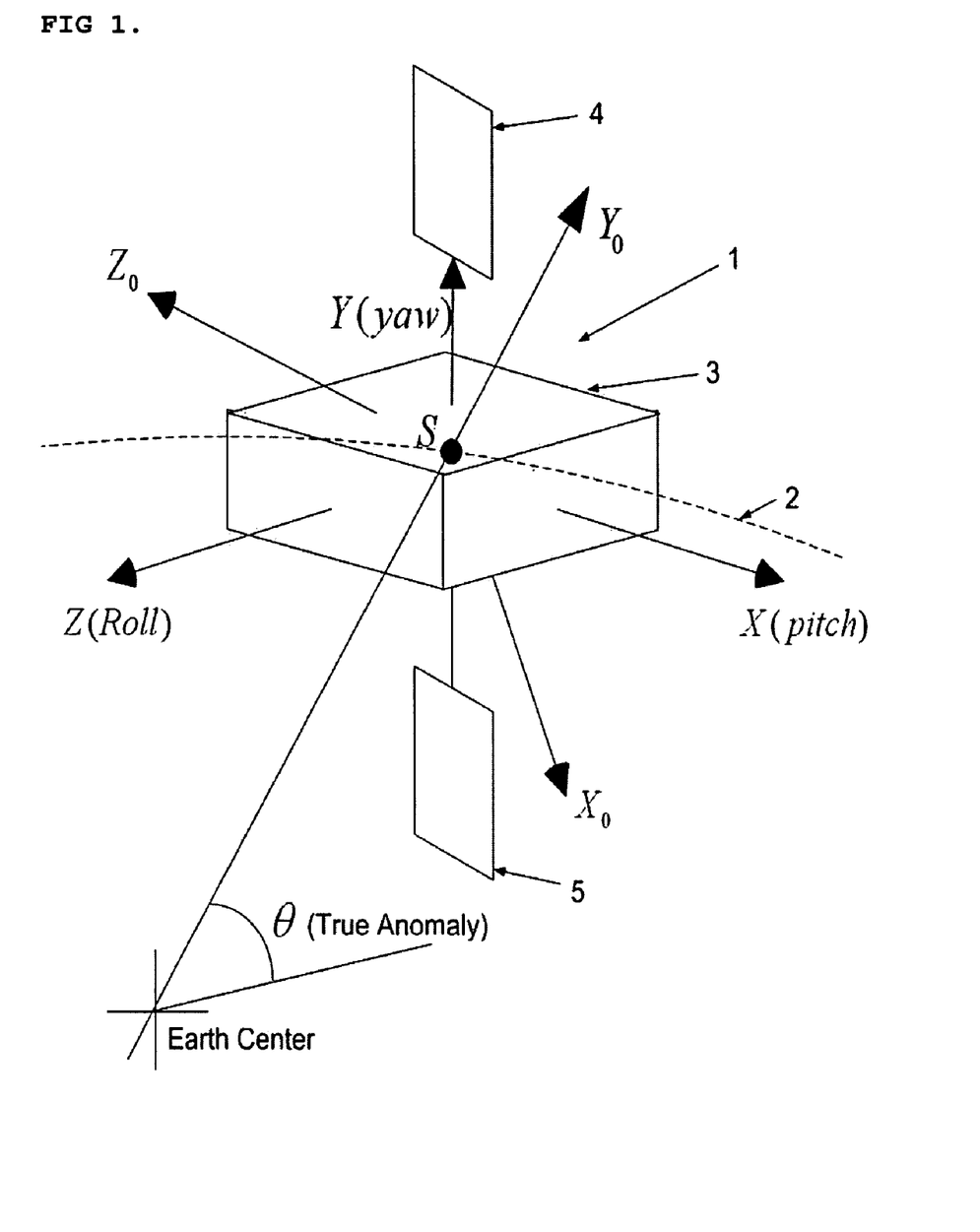
FIG. 1 shows a diagrammatic view of a satellite stabilized about its axes about the Earth.
Figure 2:
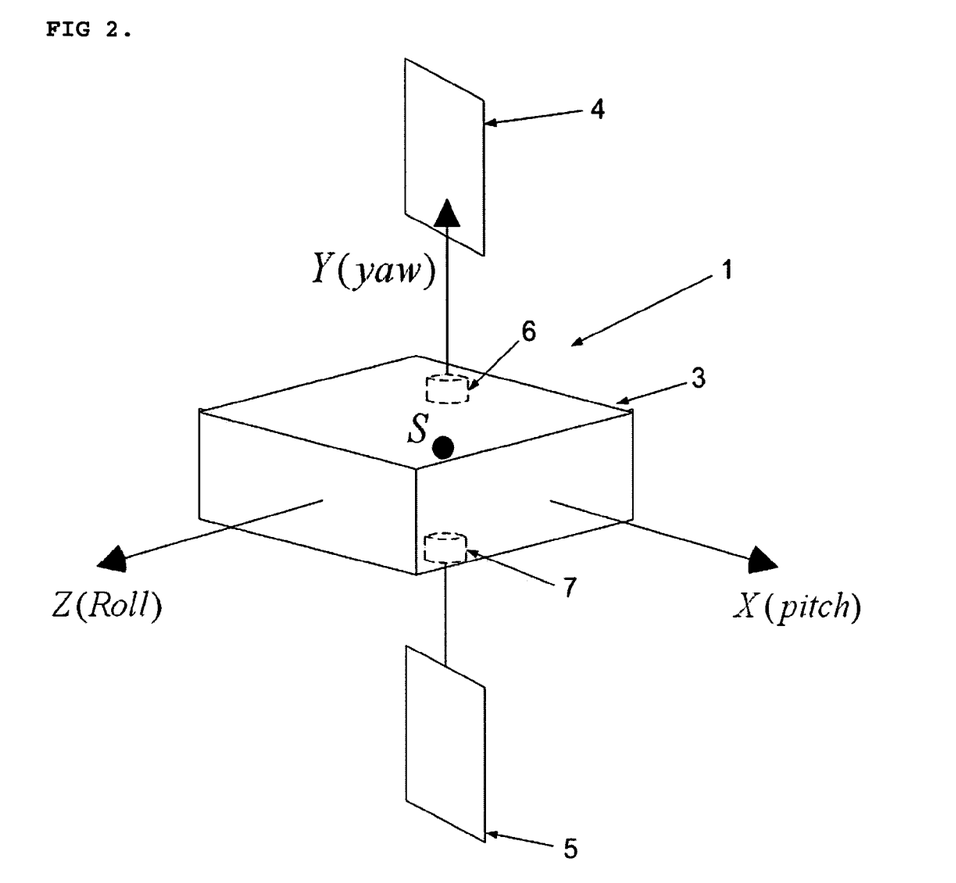
FIG. 2 shows a diagrammatic perspective view of the satellite in a configuration in which the solar pressure generates a pitch torque about the Y axis of the satellite.
Figure 3:
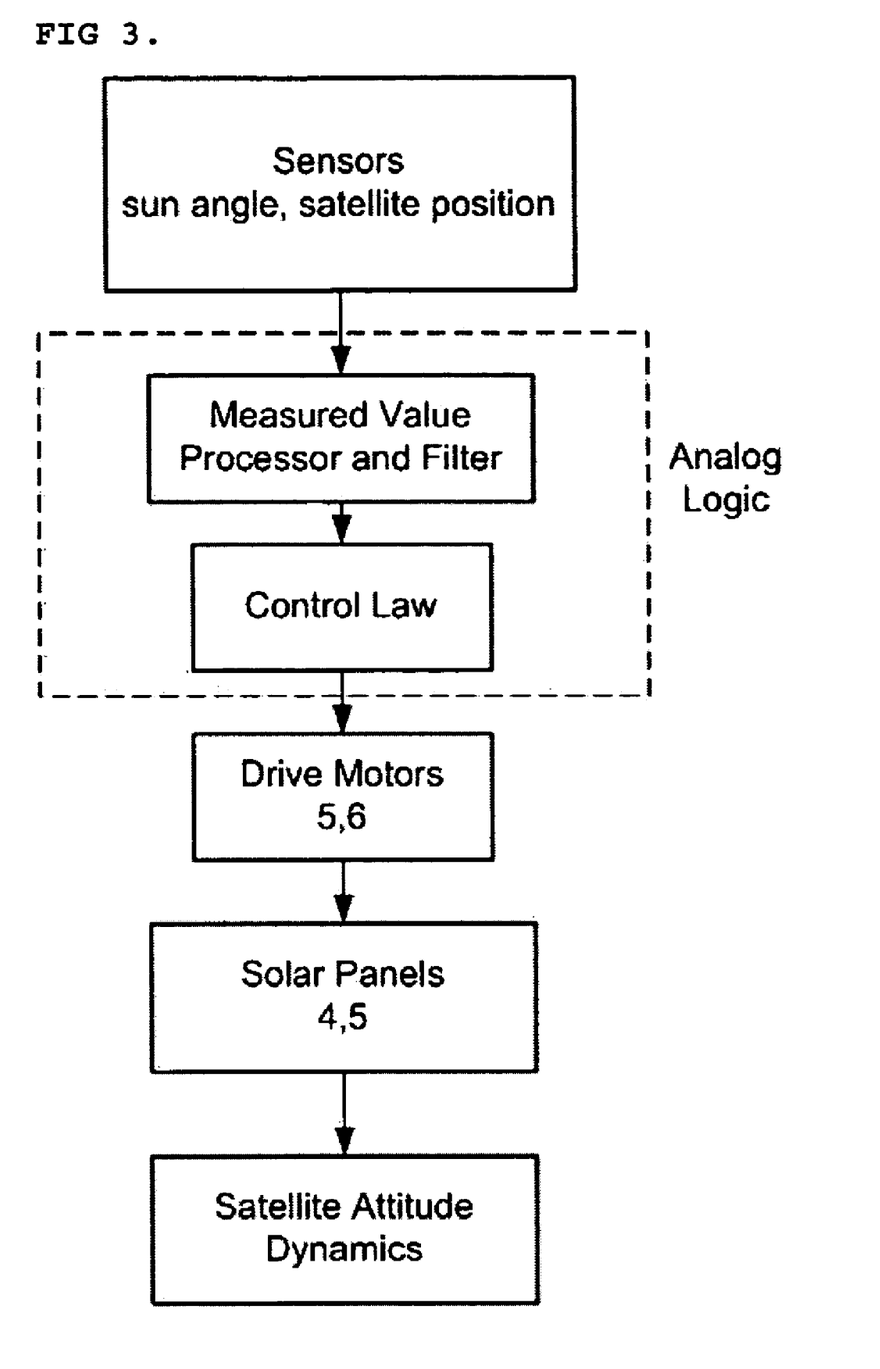
FIG. 3 shows a block diagram of the control system for the satellite.

FIG. 1 shows a satellite 1 in Earth orbit 2. The satellite 1 has a central body 3 with system center of mass at S. The two solar panels 4, 5 are attached to the central body 3 through drive motors 6, 7 (See FIG. 2). The first solar panel extending in the one direction (along the satellite body fixed Y-axis) away from the satellite body, and a second solar panel extending in the opposite direction; solar panels extending basically symmetrical and coaxial in opposite directions away from the satellite are normally coplanar. The coordinate frame XoYoZo passing through the satellite center of mass S represents the orbital reference frame. The nodal line represents the reference line in orbit for the measurement of the true anomaly, $\theta$. The $X_o$-axis is taken along normal to the orbital plane, $Y_o$-axis points along the local vertical and $Z_o$-axis represents the third axis of this right handed frame taken. The orientation of the satellite is specified by a set of three successive rotations: $\alpha$ (pitch) about the $x_0$-axis, $\phi$ about the new roll axis and finally $\gamma$ about the resulting yaw axis. The corresponding principal body-fixed coordinate axes for satellite are denoted by S-XYZ.

Herein the term "solar panel" denotes the set of cells converting the light energy into electrical energy by photovoltaic effect, for example the structure supporting these components, the mechanisms coupled to the structure to enable it to be stowed before the satellite reaches its orbital position, to deploy it and to hold it in the deployed position, and all the additional components which, in the orbital configuration, are fixed to the structure and which have various functions, for example thermal protection flaps which limit heat losses from the satellite during phases in which the solar panel is not deployed or surfaces for increasing the light impinging on the photovoltaic devices (shadow uniformization screens, for example).

The satellite 1 is provided with a pitch attitude control system compatible with any other known means of satellite control in roll and in yaw, in particular solar control, for example of the type described in one of the following references, namely, French patents 2,655,167, 2,656,586, 2,531,547, or French Patent 2,530,046, or U.S. Pat. No. 4,325,124. As explained below, this pitch control is decoupled from roll/yaw attitude control.

Also, the present invention is compatible with philosophy underlying the teachings of the references mentioned above, hereby incorporated by way of reference, which is to add only minimum items to the satellite, or even none at all.

Coupled to a device of the same kind as those mentioned above, the invention makes it possible to use SRP to control the attitude of the satellite about its pitch axis.

It will be appreciated that attitude control about at least one of the roll, pitch and yaw axes is provided totally or partially by a system utilizing solar pressure on surfaces of the satellite;

It will be realized that the invention proposes a novel combination of components known and already proven in orbit over a period of many years such as solar panel rotation devices (all geosynchronous satellites).

The remainder of the description discloses how the invention achieves pitch control of the satellite. It may be recognized that in elliptic orbits the satellite pitch motion directly gets affected in the first order approximation as compared to its counterparts roll and yaw motions. So, in order to suitably control the attitude of the satellite in elliptic orbits, we must ensure the control of the pitch motion. In fact, if there are no disturbances to the roll and yaw motions, they would never get excited due to the pitch motion or eccentricity as well. As our focus in this investigation is to devise a control strategy to counter the adverse effect of eccentricity on the satellite attitude, the control of pitch motion is considered and the roll and yaw motions remain uncontrolled. Assuming no roll and no yaw motions, we write the pitch motion of the satellite as $$(1+e\cos\theta)\alpha''-2e\sin\theta(1+\alpha')-3(K_{yx}-K_{zx})\cos\alpha\sin\alpha=\hat{T}_{sx}\,[(1-e^2)/1+e\cos\theta)]^3 \quad (1)$$

where a, e=semi-major axis and eccentricity of the system center of mass; $K_1=(I_x-I_y)/I_z$; $K_2=(I_x-I_z)/I_y$; $K_{yx}=I_y/I_x=1-K_1(K_2-1)/(K_1K_2-1)$; $K_{zx}=I_z/I_x=(K_2-1)/(K_1K_2-1)$; $I_k$=principal centroidal moment of inertia of satellite about k-axis, k=x,y,z; $\hat{T}_{sx}=T_{sx}/(I_x\Omega^2)$; $T_{sx}$=torque due to solar radiation pressure; $\theta$=true anomaly; $\Omega=(\mu/a^3)^{1/2}$; $\mu$=Earth's gravitational constant; (.)', (.)''=d(.)/d$\theta$ and $d^2(.)/d\theta^2$, respectively.

Next, we derive the control torque due to solar radiation pressure. The force acting on the plate-j due to the solar radiation pressure is given as $$\vec{F}_{sj} = pA_j|\vec{s}_j\cdot\vec{n}_j|\left\{(1-\rho_s-\rho_t)\vec{s}_j + \left[2\rho_s(\vec{s}_j\cdot\vec{n}_j) + \frac{2}{3}\rho_d\right]\vec{n}_j\right\}, \quad (2)$$
$$j = 1, 2,$$

where $\rho_s+\rho_t+\rho_d=1$; $A_j$=surface area of solar panel-j exposed to impinging photons; p=nominal solar radiation pressure constant at 1 astronomical unit from the Sun; $\rho_d, \rho_s, \rho_t$=fractions of impinging photons diffusely reflected, specularly reflected, and transmitted, respectively;

$\vec{n}_j$ = unit vector normal to the solar panel – j;

$\vec{s}_j$ = unit vector of the incoming light from the sun on the solar panel – j.

Considering a highly reflective surface (i.e., $\rho_d$=0; no absorption, specular reflection only), the preceding expression (2) simplifies to $$\vec{F}_{sj} = 2\rho_s pA_j|\vec{s}_j\cdot\vec{n}_j|(\vec{s}_j\cdot\vec{n}_j)\vec{n}_j, \quad (3)$$

where $$\vec{s}_j = s_{xj}\hat{i} + s_{yj}\hat{j} + s_{zj}\hat{k};$$

$s_{xj}=\sin\psi\sin(i-\epsilon_s)$; $s_{yj}=-\cos\psi\cos(\theta+\alpha)-\sin\psi\cos(i-\epsilon_s)\sin(\theta+\alpha)$; $s_{zj}=\cos\psi\sin(\theta+\alpha)-\sin\psi\cos(i-\epsilon_s)\cos(\theta+\alpha)\cos\gamma$; i=satellite orbit inclination with respect to the equatorial plane; $\epsilon_s$=angle between the equatorial and the ecliptic planes; $\psi$=solar aspect angle or the angle between the direction of the sun and the nodal line.

We consider the axis of the solar panel-j is initially aligned to the $k_o$-axis. The angle $\beta_j$ denotes rotation about the $i_o$-axis. Thus, the torque exerted by the solar panel-j on the satellite is $$\vec{T}_{sj} = \vec{r}_j\times\vec{F}_{sj} = (-1)^{j+1}2\rho_s pA_j r_j|\vec{s}_j\cdot\vec{n}_j|(\vec{s}_j\cdot\vec{n}_j)[\cos\beta_j]\hat{i}, \quad (4)$$

where $r_j$=distance between the system center of mass S and the center of pressure for solar panel-j, j=1,2.

Assuming the cross-sectional area of the panel and the distance between the system center of mass S and the center of pressure for both the solar panels being the same (i.e., $A_j$=A, $r_j$=r), the components of the total solar torque about the satellite body axes can be written as $$T_{sx} = 2\rho_s pAr\left[|\vec{s}_1\cdot\vec{n}_1|(\vec{s}_1\cdot\vec{n}_1)\cos\beta_1 - |\vec{s}_2\cdot\vec{n}_2|(\vec{s}_2\cdot\vec{n}_2)\cos\beta_2\right]. \quad (5)$$

The corresponding dimensionless torque is $$\hat{T}_{sx} = C\left[|\vec{s}_1\cdot\vec{n}_1|(\vec{s}_1\cdot\vec{n}_1)\cos\beta_1 - |\vec{s}_2\cdot\vec{n}_2|(\vec{s}_2\cdot\vec{n}_2)\cos\beta_2\right], \quad (6)$$

where $C=2\rho_s pAr/(I_x\Omega^2)$ is dimensionless solar parameter

With a view to devise suitable control laws using solar radiation pressure, the nonlinear and non-autonomous system equations of motion Eq. (1) along with Eq. (6) is simplified by considering small amplitude librations and low eccentricities, and ignoring the second and higher order terms in $\alpha$, and e. The resulting equations of motion of the system are $$\alpha''-3(K_{yx}-K_{zx})\alpha=2e\sin\theta+2C|D_1|D_2(\beta_1-\beta_2) \quad (7)$$

, where $$D_1=\cos\psi\sin\theta-\sin\psi\cos(i-\epsilon_s)\cos\theta \quad (8), \text{and}$$

$$D_2=\cos\psi\cos\theta+\sin\gamma\cos(i-\epsilon_s)\sin\theta \quad (9).$$

As per the preceding Eq. (7), the deterioration of the satellite pitch response may be chiefly attributed to the periodic excitation term $2e\sin\theta$. Our strategy is to devise a suitable control laws so as the neutralized this excitation, i.e., $$2e\sin\theta + 2C|D_1|D_2(\beta_1-\beta_2) = 0, \text{ or} \quad (10)$$

$$\beta_1 - \beta_2 = -\frac{sgn(D_2)e\sin\theta}{C|D_1D_2|}. \quad (11)$$

Using Eqs. (8–9), we can write $D_1D_2$ as $$D_1D_2 = B\sin(2\theta+\varphi), \quad (12)$$
where $$B = [B_1^2 + B_2^2]^{1/2}; B_1 = \frac{1}{2}[\cos^2\psi - \sin^2\psi\cos^2(i-\epsilon_s)]; \quad (13)$$
$$B_2 = -\cos\psi\sin\psi\cos(i-\epsilon_s); \varphi = \tan^{-1}(B_2/B_1).$$

As per Eq. (12), the term $D_1D_2$ varies as $\theta$ changes and it gets zero when $\theta = -\phi/2$ leading to $(\beta_1-\beta_2)$ infinite. In order to remove this anomaly, we take the average value of the term $D_1D_2$ as $$|D_1D_2|_{avg} = \frac{2B}{\pi}\int_{-\varphi/2}^{(\pi-\varphi)/2} B\sin(2\theta+\varphi)d\theta = \frac{2B}{\pi}. \qquad (14)$$

Substituting $|D_1D_2|_{avg}$ in Eq. (11), we get the open-loop control law as $$\beta_1 - \beta_2 = -\frac{\text{sgn}(D_2)\pi e \sin\theta}{2CB}, \qquad (15)$$

or the open-loop variation of $\beta_j$ would be $$\beta_j = (-1)^j \frac{\text{sgn}(D_2)\pi e \sin\theta}{4CB}, \, j=1,2. \qquad (16)$$

The Eq. (16) ensures the preceding condition (10) only to some extend as the average value of the term $D_1D_2$ can not cancel the excitation due to eccentricity completely. It is also proper to mention here that the smaller the value of e, more rigorous is expected to be the eccentricity neutralization.

The maximum solar panel deflection using the controller law Eq. (16) is $$|\beta_j|_{\max} = \frac{\pi e}{4CB}, \, j=1,2. \qquad (17)$$

As per the preceding Eq. (17), the $|\beta_j|_{max}$ is directly proportional to eccentricity e and inversely proportion to C and B.

Next, we formulate simple criteria to find the satellite in the Earth shadow as the proposed control strategy would become ineffective whenever the satellite is in the Earth shadow. We consider the Earth is a perfect sphere and the Sun is assumed to be at infinite distance from the Earth. Applying geometrical relations, we find the conditions for the satellite to be in the Earth's shadow as $$\cos\xi < 0 \text{ and } R_E - R(1-\cos^2\xi)^{1/2} > 0 \qquad (18),$$

where $\cos\xi = \cos\psi\cos\theta + \sin\psi\cos(i-\epsilon_s)\sin\theta$; R=orbital radius=$a(1-e^2)/(1+e\cos\theta)$; $R_E$=Earth radius.

To know whether the satellite is in the Earth's shadow or not, we define $\delta$ as $\delta=1$, if Eqs. (18) is satisfied;

$\delta=0$, if Eqs. (18) is not satisfied, (19).

In the case the satellite is under the Earth's shadow, $\hat{T}_{sx}=0$.

In order to study the performance of the proposed controller, the detailed system response is numerically simulated using the system equation of motion Eq. (1) and the control laws Eq. (16) with the initial conditions: $\alpha_o=\phi_o=\gamma_o=0$ deg. The inclination between the equatorial and ecliptic plane is takes as $\epsilon_s$=23.5 deg. The integration is carried out using the International Mathematical and Statistical Library (IMSL) routine DDASPG based on the Petzoid-Gear BDF method.

Figure 4:
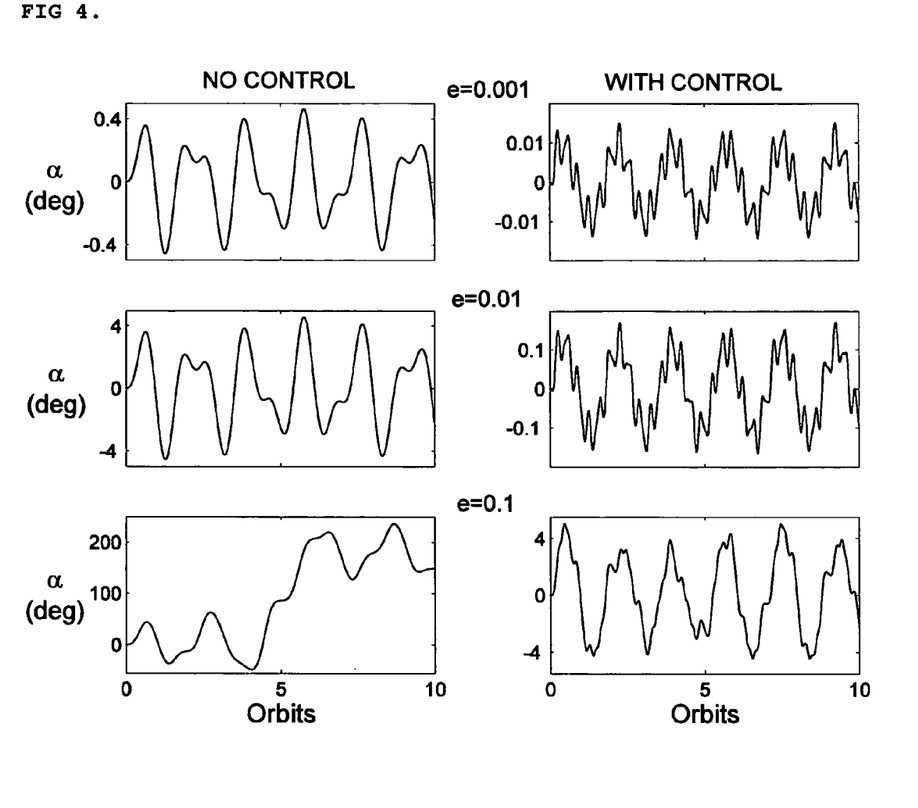
FIG. 4 shows satellite attitude response as affected by eccentricity: $K_1=0.3$, $K_2=0.2$, $C=5$, $\psi=45$ deg, $i=0$ deg, $\alpha'_o=0$.
Figure 5:
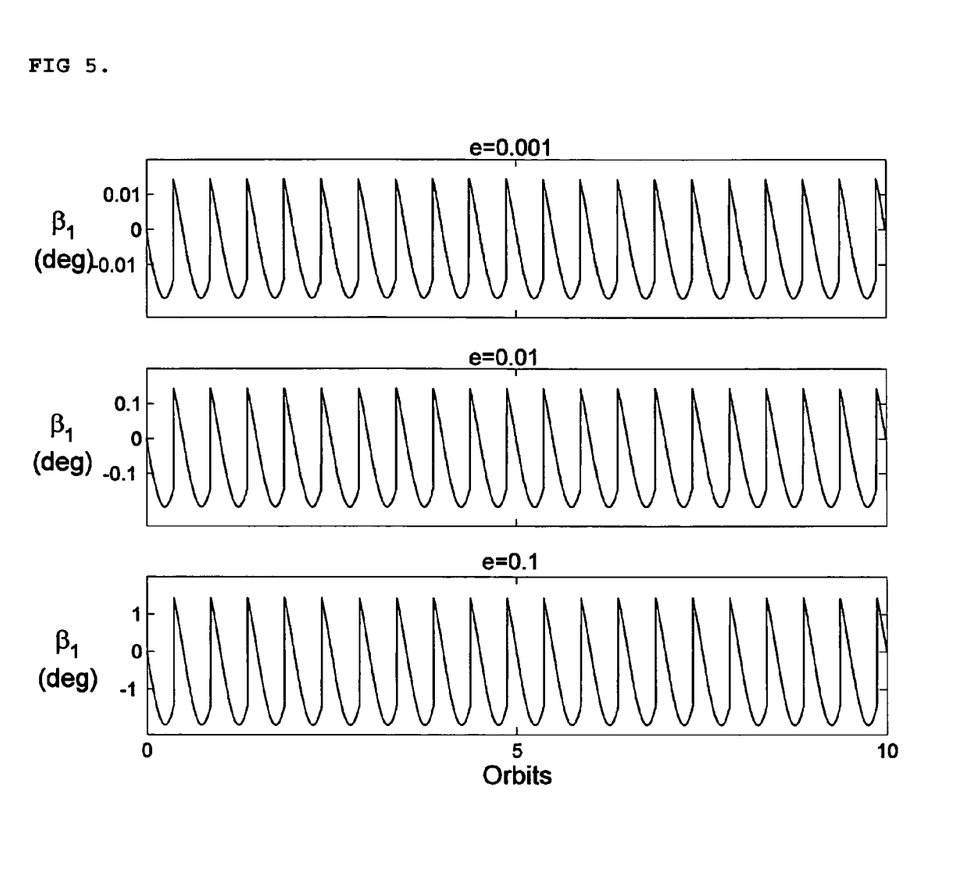
FIG. 5 depicts the controller showing the variation of rotational angles of the solar panel: $K_1=0.3$, $K_2=0.2$, $C=5$, $\psi=45$ deg, $i=0$ deg, $\alpha'_o=0$.

We first examine the effect of orbital eccentricity on satellite attitude response (FIG. 4). It is found that the attitude angles of the satellite without control are $|\alpha|_{max}$=0.5 deg, 4.6 deg, 235.6 deg for eccentricity of 0.001, 0.01 and 0.1, respectively, in 10 orbits. In fact, in the case of e=0.1, the satellite attitude response becomes unstable. However, the proposed control strategy based on open-loop control law negates the disturbances caused by eccentricity and dramatically improves the attitude response making $|\alpha|_{max}$ reduces to 0.015 deg, 0.17 deg, 5 deg for e=0.001, 0.01 and 0.1, respectively and that is to say that the attitude response improves by a factor of more than 25 times. It is remarkable to see that even the unstable response in the third case turns out to be stable once with the application of the proposed solar controller. The rotation angle $|\beta_j|_{max}$ for the solar panel as per Eq. (17) for these cases are found as 0.0196 deg, 0.196 deg, and 1.96 deg, respectively. The $\beta_1$ response in FIG. 4 shows the similar values. We just show the $\beta_1$ response in FIG. 5 as $\beta_2$ response with regard to Eq. (16) would be opposite of $\beta_1$ response. Thus, rotating the solar panel by fraction of a degree, it is possible to achieve high satellite attitude performance.

A simple open-loop control strategy for rotating solar plates to cause proper solar radiation pressure torque is developed by the analytical approach to neutralize the excitation caused by eccentricity. The open-loop control law only takes the information about the true anomaly and the sun angle, and eccentricity. The performance of the proposed control strategy is verified by the numerical simulation of the governing nonlinear equations of motion. Results of the numerical simulation state that the proposed attitude control strategy dramatically improves the performance of the satellite without any control approximately by a factor of more than 20 times in general. It is found that the controller requires rotation of the solar panel by fraction of a degree only to impart such a high attitude performance. The performance of the proposed controller remains almost unaffected by changes in solar control parameter C, sun angle, $\psi$, and orbital inclination i. However, very small value of C on order of $\frac{1}{100}$ affects the attitude performance considerably as expected.

With regard to the effect of satellite mass distribution parameters, the proposed control strategy can only stabilize the satellites with mass distribution parameter $K_1 > K_2$ or in other words, the satellites having favorable gravity gradient mass distribution configurations can be stabilize by the proposed controller. Increasing e deteriorates the performance of the controller. However, it can successfully stabilize the satellite even in the eccentricity as high as 0.1. Even considering the Earth shadow effect, the controller is able to stabilize the satellites in geostationary or higher earth orbits. Thus, the proposed open-loop control strategy may be useful for satellites in elliptic orbits.

Figure 6:
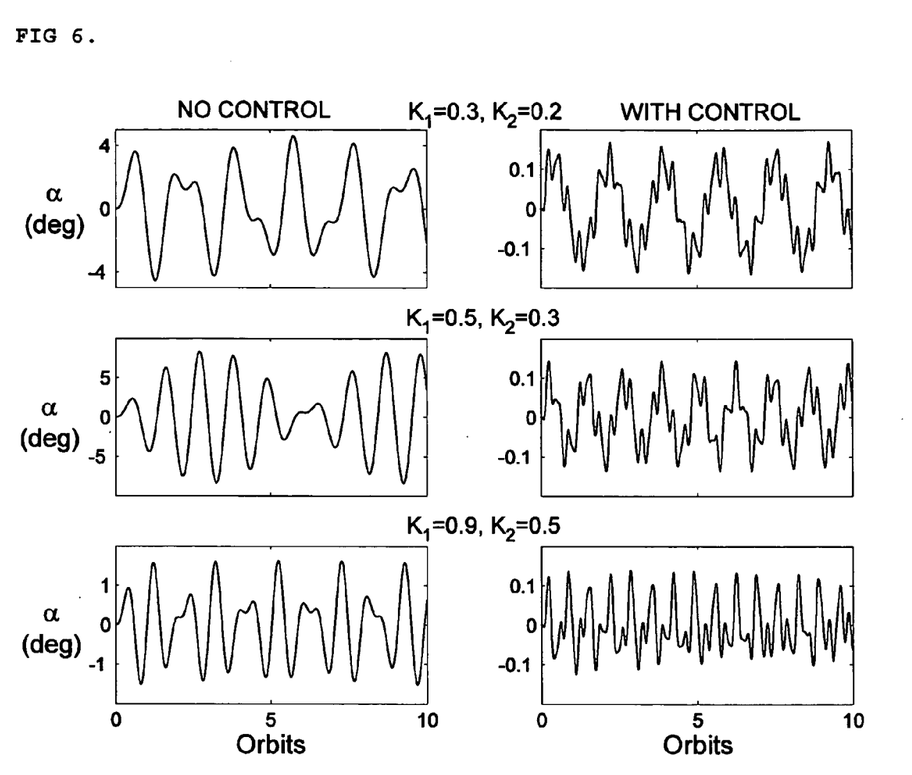
FIG. 6 shows the satellite attitude response as influenced by the mass distribution parameters $K_1$ and $K_2$: $e=0.01$, $C=5$, $\psi=45$ deg, $i=0$ deg, $\alpha'_o=0$.

The effects of mass moment of inertia distribution parameters $K_1$ and $K_2$ on the system attitude response are shown in FIG. 6. As the parameters are changed from $K_1$=0.3, $K_2$=0.2 to $K_1$=0.9, $K_2$=0.5, the satellite attitude response without control gets affected with $|\alpha|_{max}$=1.6 deg being the lowest for the case of $K_1$=0.9, $K_2$=0.5. This phenomenon is due to the fact that the mass distribution parameter $K_1$=0.9, $K_2$=0.5 corresponds to $K_{yx}-K_{xx}$=−0.73 and thus it is the most favorable gravity gradient mass distribution. However, with the proposed control law, the satellite attitude response remain virtually unaffected with $|\alpha|_{max}$=0.17 deg. The plots in FIG. 6 show the insensitivity of the controller. It is to be mentioned here that we have only considered the cases of $K_1 > K_2$ and $K_1, K_2 > 0$, which are the favorable gravity gradient configurations for the stable satellite pitch motion. In fact, the satellite attitude motion without control for the cases of $K_1<K_2$ and $K_1$, $K_2>0$ or $K_1>K_2$ and $K_1$, $K_2<0$, would be unstable. Even applying the solar radiation pressure using the proposed open-loop controller can not make the system stable. This limitation of the controller can be attributed to the fact that the controller as per Eq. (10) only neutralize the excitation caused by eccentricity and it does not remove the excitation caused by gravity-gradient forces.

Figure 7:
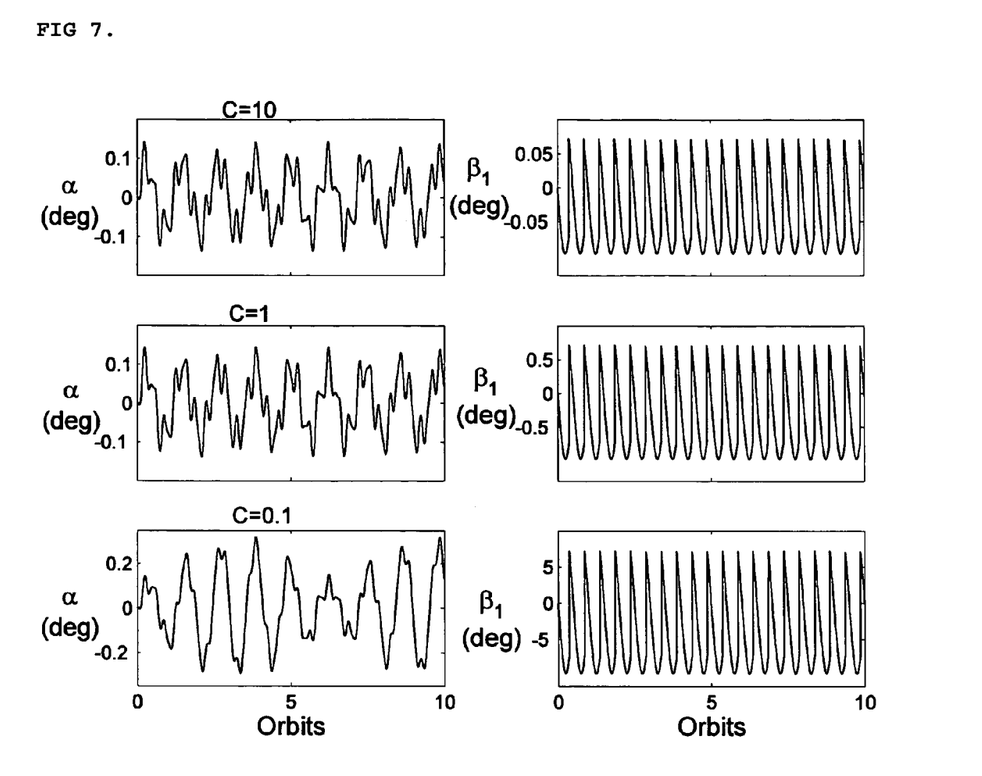
FIG. 7 shows the effect of solar parameter C on controller performance: $e=0.01$, $K_1=0.5$, $K_2=0.3$, $\psi=45$ deg, $i=0$ deg, $\alpha'_o=0$.

Next, we examine the effect of solar parameter C on the controller performance (FIG. 7). The satellite attitude response remains almost the same with $|\alpha|_{max}=0.14$ deg as the parameter C is changed from 10 to 1. By decreasing C further by a factor of 10, the satellite attitude response gets slightly affected with $|\alpha|_{max}=0.32$ deg stating the robustness of the controller. With regard to the solar panel rotation angle $|\beta_j|$, $|\beta_j|_{max}$ angles are 0.098 deg, 0.98 deg, and 9.8 deg for C=10, 1, and 0.1, respectively. These values and trend match exactly with Eq. (17) which state that $|\beta_j|_{max}$ is inversely proportional to C. The slight deterioration in satellite attitude response is due to decrease of solar pressure control torque as per Eq. (6) by decreasing C, even though the control law Eq. (16) takes care of changes in C by making corresponding changes in $|\beta_j|_{max}$.

Figure 8:
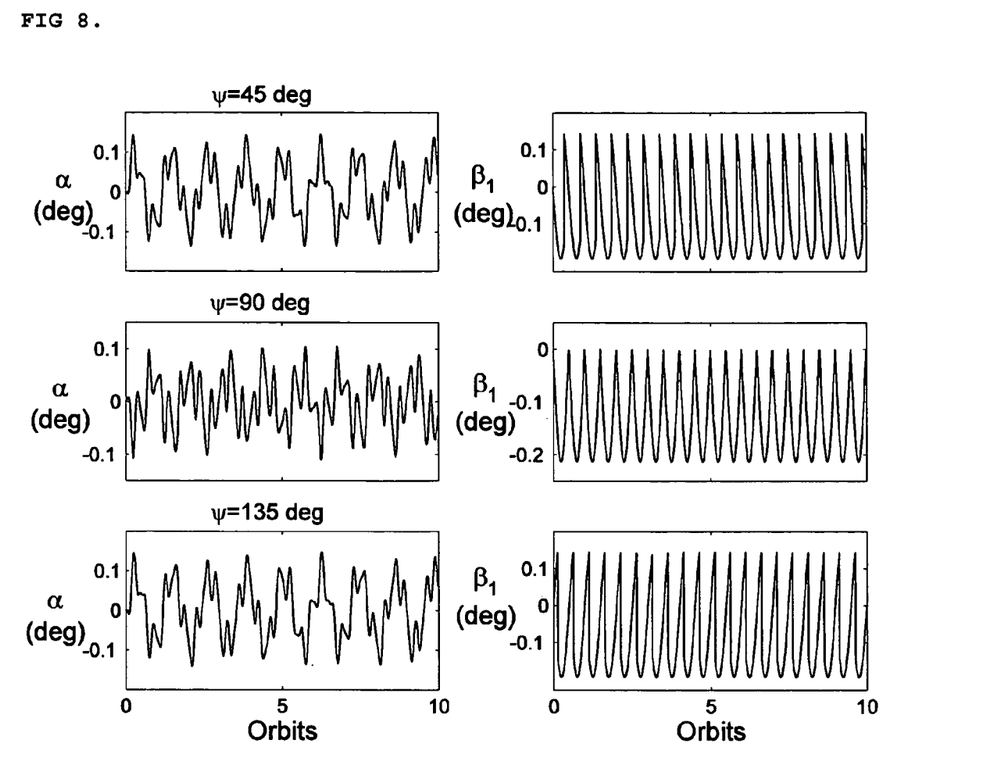
FIG. 8 illustrates the effect of sun angle $\psi$ on controller performance: $e=0.01$, $K_1=0.5$, $K_2=0.3$, $C=5$, $i=0$ deg, $\alpha'_o=0$.

FIG. 8 shows the effect of the solar angle $\psi$ on the controller performance. As $\psi$ is increased from 45 deg to 135 deg, the satellite attitude angle $|\alpha|_{max}$ remains almost unchanged with $|\alpha|_{max}=0.15$. However, the pattern of $\beta_1$ response gets changed keeping $|\beta_j|_{max}$ almost constant with 0.2 deg. For the case of $\psi=90$ deg, $\beta_1$ never have positive value. Substituting $\psi=90$ deg in Eq. (16), we get $$\beta_j = (-1)^j \frac{\text{sgn}[\cos(i-\varepsilon_s)\sin\theta]\pi e\sin\theta}{2C}, j=1,2. \quad (20)$$

Figure 9:
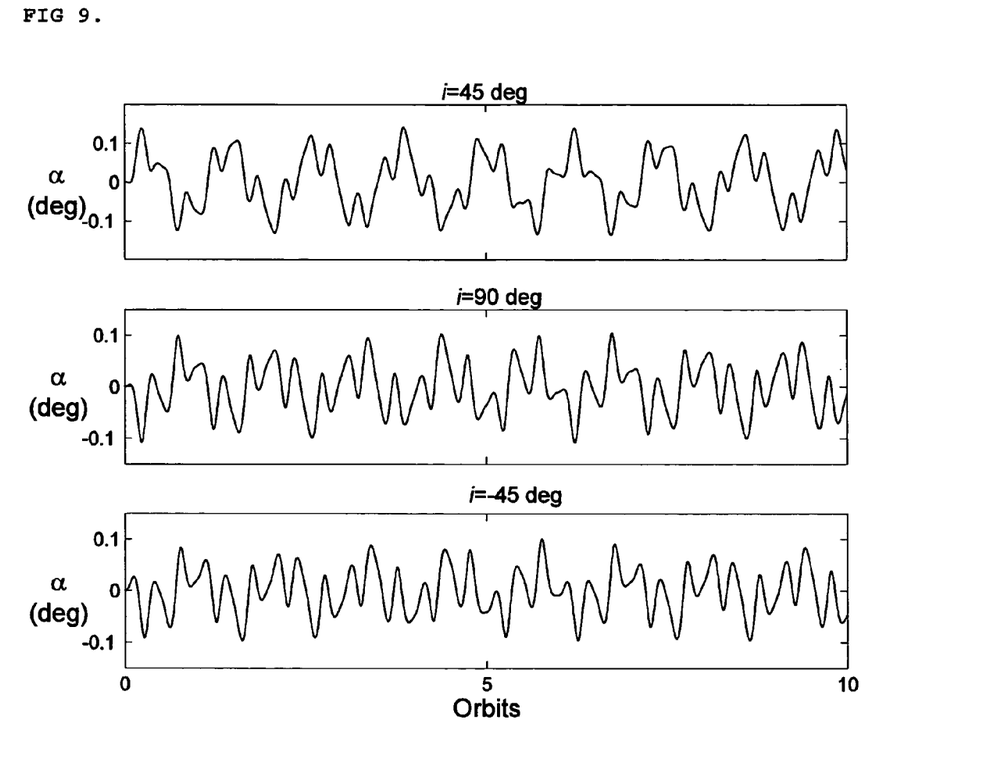
FIG. 9 shows the effect of orbital inclination i on controller performance: $e=0.01$, $K_1=0.5$, $K_2=0.3$, $C=5$, $\psi=45$ deg, $\alpha'_o=0$.

The term $\cos(i-\epsilon_s)$ with orbit inclination i=0 deg has positive sign and therefore, the term $\text{sgn}[\cos(i-\epsilon_s)\sin\theta]$ has the same sign as of $\sin\theta$ and that is why $\beta_j$ sign remains unchanged in Eq. (20). Next, we investigate the effect of orbital inclinations on the controller performance (FIG. 9). We change i=45 deg to i=-45 deg. However, the attitude response remains unaffected with $|\alpha|_{max}=0.14$ deg.

Figure 10:
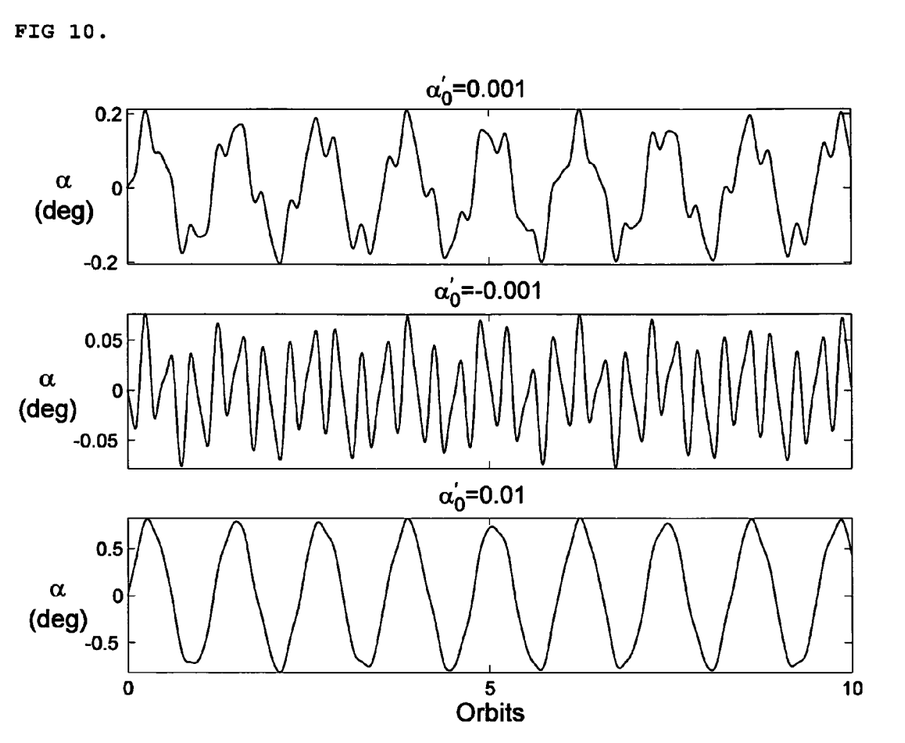
FIG. 10 shows the controller performance as affected by initial attitude rate disturbances: $e=0.01$, $K_1=0.5$, $K_2=0.3$, $C=5$, $\psi=45$ deg, $i=0$ deg.

Finally, for an appreciation about the efficacy of the proposed control strategy, we apply the proposed strategy to a typical satellite with moment of inertias as $I_x=400$ kg-m$^2$, $I_y=300$ kg-m$^2$, and $I_z=500$ kg-m$^2$. The solar panel considered has following specifications: A=0.25 m$^2$, r=3 m. The values of constant parameters are $\mu=3.9860015\times10^{14}$, and p=4.563×10$^{-6}$ N/m$^2$. We also consider the Earth shadow effect described in Section III. As we can find from Eq. (18), the Earth shadow effect is more pronounced when the solar angle $\psi=0$ or 180 deg. Therefore, we consider the worst situation of $\psi=0$ and apply our control strategy. We take two cases: the first one being the satellite in the orbit of semi-major axis a=42241 km while in the second case, the satellite has a semi-major axis a=9378 km. As per FIG. 10, the attitude angle $|\alpha|_{max}$ in the first case is 0.1 deg and it is far better than the case without control 4.2 deg. However, in the second case although the response is still better than the system without control, but $|\alpha|_{max}$ increases to 1.1 deg. With regard to the solar panel rotation angle $|\beta_j|$, $|\beta_j|_{max}$ angle is 0.3 deg in the first case while in the second case it increases to 25.4 deg. This increase is because of the increase in values of C from 3.24 in the first case to 0.0354 in the second case. Thus, with the decrease of C approximately by 100 times, the $|\beta_j|_{max}$ as per Eq. (17) will increase by 100 times that is what we observed here. We find in FIG. 11 that the attitude response in the second case has deteriorated and $|\alpha|_{max}$ has increased by 10 times compared to the first case. This deterioration is due to decrease C as well as because of the fact that the controller in the second case remains off more often (i.e., 24% of the orbit) compared to the first case (i.e., 5% of the orbit). We can theoretically calculate the size of the eclipse region for satellite in a circular orbit as $$R\cos\left(\frac{\pi-\xi_s}{2}\right) = R_E, \text{ or } \xi_s = 2\sin^{-1}\left(\frac{R_E}{R}\right). \quad (21)$$

Figure 11:
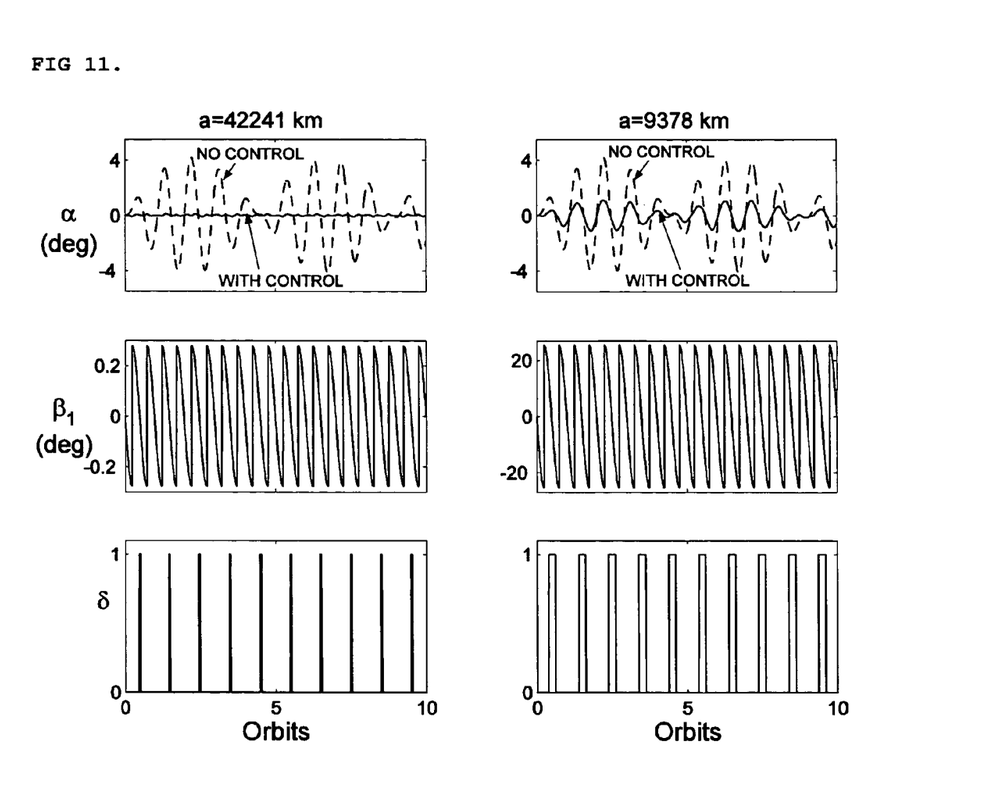
FIG. 11 illustrates the efficacy of the proposed control strategy for typical cases: $e=0.01$, $\psi=0$ deg, $i=0$ deg, $\alpha'_o=0$.

Thus, we find that the Earth shadow effect is more sever in medium or lower Earth orbits compared to the geostationary or higher earth orbits and the proposed control strategy is not very attractive for the satellites in these orbits.

The invention also applies to any satellite in respect of which the necessary calculations are carried out in whole or in part on the ground.

What is claimed is:

1. A method for controlling attitude of a satellite in an elliptic orbit, the method comprising:
    calculating a pitch motion of the satellite under the assumption of no roll and yaw motions;
    deriving a control torque due to solar radiation pressure acting on a pair of solar panels of the satellite;
    devising a suitable control function by ignoring second and higher order terms from the calculated pitch motion and derived control torque;
    removing a periodic excitation term from the suitable control function;
    determining a maximum solar panel deflection after getting an open-loop control function by removing the periodic excitation term; and
    rotating one or both of the pair of solar panels of the satellite according to the maximum solar panel deflection.

2. The method according to claim 1, wherein the method further comprises determining whether the satellite is in the Earth's shadow.

3. The method according to claim 1, wherein the open-loop control function is represented in the following formulas:
    (i) if one of the pair of solar panels rotates, then $\beta_j=\{sgn(D_2)*\pi e*\sin\theta\}/\{2*C*B\}(j=1$ or 2); and (ii) if the pair of solar panels rotate, then $\beta hd\ j=(-1)^j \{sgn(D_2)*\pi*e\sin\theta\}/\{4*C*B\}(j=1$ or 2), wherein
    $B=B_1^2+B_2^2$;
    $B_1=\frac{1}{2}(\cos^2\phi-\sin^2\phi*\cos^2(i-\epsilon_s))$;
    $B_2=-\cos\phi*\sin\phi*\cos(i-\epsilon_s)$;
    $D_2=\cos\phi*\cos\theta+\sin\phi*\cos(i-\epsilon_s)$;
    $\Omega=(\mu/a^3)^{1/2}$;
    $C=2\rho_s pAr/(I_x\Omega^2)$;
    $\phi=\tan^{-1}(B_2/B_1)$;
    $\theta$ is true anomaly;
    e is eccentricity;
    $I_x$ is a principal centroidal moment of inertia of satellite about pitch axis;
    $\mu$ is the earth's gravitational constant;
    A is a cross-sectional solar panel area;

r is a distance between satellite center of mass and center of pressure of solar panel;

a is the semi-major axis of the Earth's orbit;

$\epsilon_s$ is the angle between equatorial and ecliptic planes;

i is the satellite orbit inclination with respect the equatorial plane;

$\rho_s$ is the fraction of specularly reflected photons; and p is the nominal solar radiation pressure constant at one astronomical unit from the sun.

4. A method according to claim 1, wherein the maximum solar panel deflection is represented in the following:

$|\beta_j| = (\pi * e)/(4 * C * B)(j=1 \text{ or } 2)$, wherein $B = B_1^2 + B_2^2$;

$C = 2\rho_5 p A r/(I_x \Omega^2)$;

$B_1 = \frac{1}{2}(\cos^2\phi - \sin^2\phi * \cos^2(i-\epsilon_s))$;

$B_2 = -\cos\phi * \sin\phi * \cos(i-\epsilon_s)$;

$\phi = \tan^{-1}(B_2/B_1)$;

$\Omega = (\mu/a^3)^{1/2}$ $\theta$ is true anomaly;

e is eccentricity;

$I_x$ is a principal centroidal moment of inertia of satellite about pitch axis;

$\mu$ is the earth's gravitational constant;

A is a cross-sectional solar panel area;

r is a distance between satellite center of mass and center of pressure of solar panel;

a is the semi-major axis of the Earth's orbit;

$\epsilon_s$ is the angle between equatorial and ecliptic planes;

i is the satellite orbit inclination with respect the equatorial plane;

$\rho_s$ is the fraction of specularly reflected photons; and p is the nominal solar radiation pressure constant at one astronomical unit from the sun.

* * * * *